United States Patent
Roy et al.

(10) Patent No.: US 8,547,667 B1
(45) Date of Patent: Oct. 1, 2013

(54) METHOD AND SYSTEM FOR PROVIDING A HARD BIAS STRUCTURE IN A MAGNETIC RECORDING TRANSDUCER

(75) Inventors: Anup Ghosh Roy, Fremont, CA (US); Ming Mao, Pleasanton, CA (US); Mahendra Pakala, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 864 days.

(21) Appl. No.: 12/324,735

(22) Filed: Nov. 26, 2008

(51) Int. Cl.
*G11B 5/127* (2006.01)

(52) U.S. Cl.
USPC ..................... 360/324.12; 428/815

(58) Field of Classification Search
None
See application file for complete search history.

(56) References Cited

U.S. PATENT DOCUMENTS

| | | | |
|---|---|---|---|
| 4,743,491 A | 5/1988 | Asada et al. | |
| 6,249,407 B1 | 6/2001 | Aoshima et al. | |
| 6,577,477 B1* | 6/2003 | Lin | 360/324.12 |
| 6,592,976 B2 | 7/2003 | Futamoto et al. | |
| 6,638,648 B2 | 10/2003 | Yamamoto et al. | |
| 6,829,122 B2 | 12/2004 | Yamada et al. | |
| 6,926,974 B2 | 8/2005 | Kawato et al. | |
| 6,967,824 B2 | 11/2005 | Marinero | |
| 7,126,797 B2 | 10/2006 | Hasegawa et al. | |
| 7,155,810 B2 | 1/2007 | Pinarbasi | |
| 7,179,549 B2 | 2/2007 | Malhotra et al. | |
| 7,200,919 B2 | 4/2007 | Pinarbasi | |
| 7,259,941 B2 | 8/2007 | Pinarbasi | |
| 7,268,985 B2 | 9/2007 | Freitag et al. | |
| 7,310,209 B2 | 12/2007 | Freitag et al. | |
| 7,363,699 B2 | 4/2008 | Carey et al. | |
| 7,397,640 B2 | 7/2008 | Pinarbasi | |
| 7,688,555 B2* | 3/2010 | Zhang et al. | 360/324.12 |
| 2002/0015268 A1 | 2/2002 | Mao et al. | |
| 2005/0275975 A1 | 12/2005 | Zhang et al. | |
| 2006/0132988 A1* | 6/2006 | Zhang et al. | 360/324.12 |
| 2007/0064352 A1 | 3/2007 | Gill | |
| 2007/0091515 A1 | 4/2007 | Freitag et al. | |
| 2007/0253123 A1* | 11/2007 | Freitag et al. | 360/324.12 |
| 2008/0137237 A1 | 6/2008 | Freitag et al. | |
| 2008/0151438 A1 | 6/2008 | Tanaka et al. | |

OTHER PUBLICATIONS

J. K. Howard, "The Effect of Cr and W Nucleation Layers on the Magnetic Properties of CoPt Films", J. Appl. Phys. vol. 63, No. 8, pp. 3263-3265, Apr. 15, 1988.

(Continued)

*Primary Examiner* — Holly Rickman (57) ABSTRACT

A method and system for providing a magnetic transducer is described. The method and system include providing a seed layer and providing at least one adjustment layer on the seed layer. The method and system also include providing a hard bias structure on the at least one adjustment layer. The seed layer has a first template including a first template dimension and a first texture. The at least one adjustment layer has a second template including a second template dimension and a second texture. The hard bias structure has a third template including a third template dimension and a third texture. The second template is between the first template and the third template.

21 Claims, 4 Drawing Sheets

(56) References Cited

OTHER PUBLICATIONS

G. Choe et al., "High Coercivity CoPtCr, CoPt Films Deposited at High Power and High Bias Conditions for Hard Bias Applications in Magnetoresistive Heads", J. Appl. Phys. vol. 81, No. 8, pp. 4894-4896, Apr. 15, 1997.

Ryoichi Mukai et al, "Microstructure Improvement of Thin Ru Underlayer for CoCrPt-SiO2 Granular Perpendicular Media", IEEE Transactions on Magnetics, vol. 41, No. 10, pp. 3169-3171, Oct. 2005.

Michio Ohsawa, "Structure Analysis of Co-Based Alloy Thin Film Magnetic Media", Industrial Applications, Fuji Electric Corporate Research & Development Ltd., pp. 94-96, Jan. 2002.

A. Tsoukatos et al, "Cr\(CoPtCr,CoPtx( Layered Film Studies for Hard Bias Applications", J. Appl. Phys. vol. 79, No. 8, pp. 5018-5020, Apr. 15, 1996.

* cited by examiner

METHOD AND SYSTEM FOR PROVIDING A HARD BIAS STRUCTURE IN A MAGNETIC RECORDING TRANSDUCER

BACKGROUND

Figure 1:
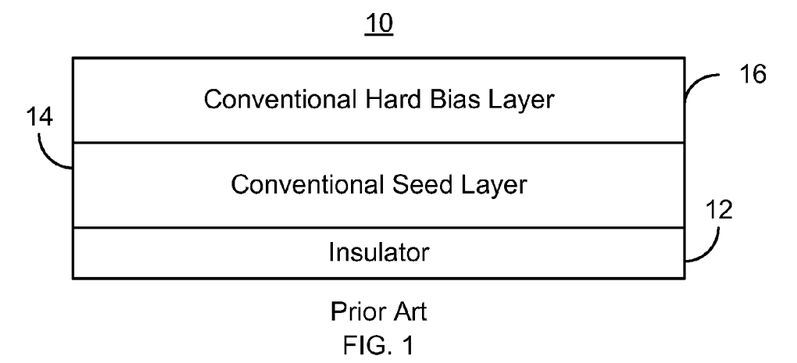
FIG. 1 is a diagram of a portion of a conventional transducer including conventional hard bias structure.

FIG. 1 depicts a portion of a conventional magnetic transducer 10, such as a conventional read transducer or other device. The conventional transducer 10 includes a conventional hard bias layer 16 and a conventional seed layer 14 that may reside on a conventional insulator 12. The conventional read transducer 10 would typically include also a conventional bottom shield, a read sensor, conventional leads, conventional insulator, and a conventional top shield, which are not shown for clarity.

The conventional seed layer 14 is formed prior to the conventional hard bias layer 16. The seed layer 14 is desired to provide a surface suitable for growth of the conventional hard bias layer 16. The conventional seed layer 14 is typically composed of a layer of Cr, CrV, or CrTi. Alternatively, the conventional seed layer 14 may be a bilayer including a Ta underlayer (not separately shown) and a W layer (not separately shown) between the conventional hard bias layer 16 and the Ta underlayer. The Ta underlayer is typically amorphous, while the upper W layer is crystalline. The conventional seed layer 14 is typically formed by sputtering the Cr, CrV, CrTi, W and/or Ta in a Xe gas plasma.

The conventional hard bias layer 16 may be used to magnetically bias the read sensor (not shown in FIG. 1). For example, the conventional magnetic hard bias structure 16 may ensure that the free layer (not shown) of the read sensor is stable and single domain. To ensure the stability of the read sensor, the conventional magnetic hard bias layer 16 should not be affected by external magnetic fields, for example from the recording media or write transducer, and be stable throughout operation. The conventional hard bias layer 16 is thus desired to have a high remanence magnetization, a large coercivity, and be thermally stable. Materials such as CoPt and CoCrPt are thus generally selected for use in the hard bias structure 16 and deposited in a Xe plasma. For such materials to have the desired magnetic properties, a high degree of in-plane crystallographic orientation and relatively small grain size are desired. Consequently, the conventional seed layer 14 is used.

Although the conventional hard bias layer 16 functions, one of ordinary skill in the art will recognize that there are drawbacks. In particular, the magnetization of the conventional hard bias layer 16 may be disturbed during operation of the conventional magnetic read transducer. As a result, the free layer may be destabilized. Consequently, performance of the conventional magnetic transducer may be adversely affected Accordingly, what is needed is a system and method for providing an improved hard bias structure.

BRIEF SUMMARY OF THE INVENTION

A method and system for providing a magnetic transducer is described. The method and system include providing a seed layer and providing at least one adjustment layer on the seed layer. The method and system also include providing a hard bias structure on the at least one adjustment layer. The seed layer has a first template including a first template dimension and a first texture. The at least one adjustment layer has a second template including a second template dimension and a second texture. The hard bias structure has a third template including a third template dimension and a third texture. The second template is between the first template and the third template.

DETAILED DESCRIPTION OF THE PREFERRED EMBODIMENTS

Figure 2:
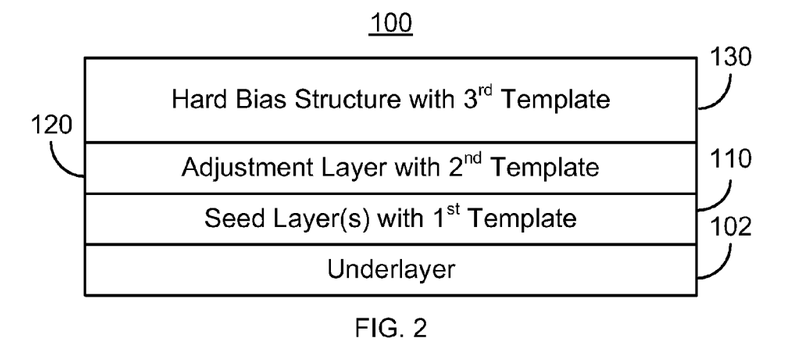
FIG. 2 depicts an exemplary embodiment of a transducer including an exemplary embodiment of a hard bias structure.

FIG. 2 depicts a magnetic transducer 100 including an exemplary embodiment of a hard bias structure. The magnetic transducer 100 may be a read transducer that might be part of a merged head that also includes a write transducer (not shown) and resides on a slider (not shown) of a disk drive (not shown). The transducer 100 is also described in the context of particular layers. However, in some embodiments, such layers may include sub-layer(s). Further, although certain layer(s) are described in the context of a single template, a layer may have multiple templates not inconsistent with the description herein. For clarity, FIG. 2 is not drawn to scale.

The magnetic transducer 100 includes an underlayer 102, one or more seed layers 110, at least one adjustment layer 120, and a hard bias structure 130. The seed layer(s) 110 includes one or more layers. In some embodiments, the seed layer(s) 110 may include an amorphous layer and a crystalline layer on the amorphous layer. For example, the seed layer(s) 110 may include a crystalline W layer on an amorphous Ta or aluminum oxide layer. Because it is grown on the amorphous layer, the crystalline layer may have its natural growth texture. Materials used for the seed layer(s) 110 may include one or more of such as W, WCr, WTi, NiAl, CrMo, CrV and CrTi. Alternatively, the seed layer(s) 110 may include other layer(s) and/or other material(s). The hard bias structure 130 is desired to have a high remanence magnetization to and may be used to bias a read sensor. Consequently, the hard bias structure 130 may include materials such as one or more of CoPt, CoCrPt, CoCrTa, and CoSm.

The adjustment layer(s) 120 reside between the seed layer(s) 110 and the hard bias structure 130. The adjustment layer(s) 120 may include materials such as one or more of Ru, Co, Cr, Mo, V, CoFe and CrTi. In other embodiments, the adjustment layer(s) 120 may include magnetic materials and/ or other nonmagnetic materials. In some such embodiments, the adjustment layer(s) 120 may be formed of the same material as the hard bias structure 130. However, as described below, the template of the adjustment layer 110 is between that of the seed layer(s) 110 and the hard bias structure 130.

The seed layer(s) 110, particularly in proximity to its top surface, may be characterized by a template. The template corresponds to a first texture and a first template dimension. The template dimension depends upon the texture. The adjustment layer(s) 120 include a second template that corresponds to a second texture and a second template dimension. Further, the hard bias structure 130 has a third template that corresponds to a third texture and a third template dimension. The third template of the hard bias structure 130 is the template of the hard bias structure 130 at least for the bottom of the hard bias structure 130. The second template of the adjustment layer(s) 120 is between the first template of the seed layer(s) 110 and the third template of the hard bias structure 130.

Figure 3:
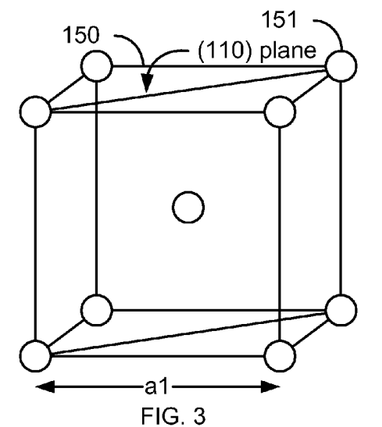
FIG. 3 depicts a three-dimensional view of an exemplary embodiment portion of a cell for a seed layer.
Figure 4:
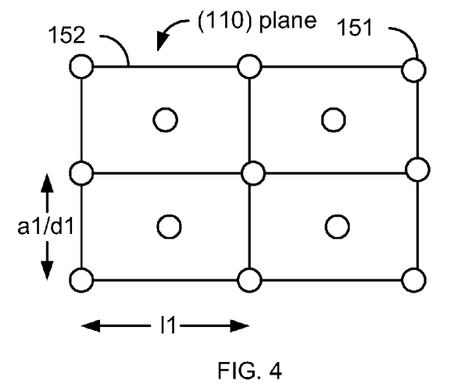
FIG. 4 depicts a view of the natural growth plane of an exemplary embodiment of a template of portion of a seed layer.
Figure 5:
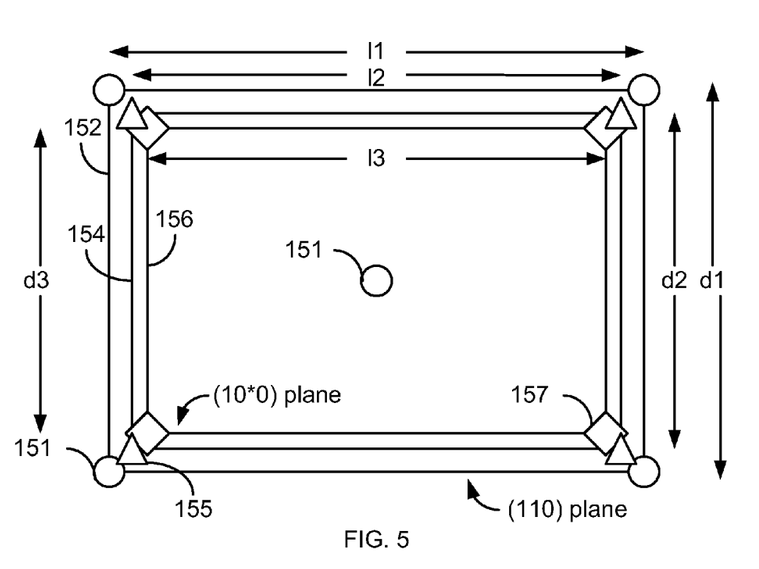
FIG. 5 depicts of portions of templates for exemplary embodiments of a seed layer, an adjustment layer, and a hard bias structure.

To better understand the templates described herein, refer to FIGS. 3-5. Note that FIGS. 3-5 are not drawn to scale. FIG. 3 depicts a three-dimensional view of an exemplary embodiment portion of a cell for the lattice 150 of a seed layer such as the seed layer 110. Referring to FIGS. 2-5, the lattice 150 of the seed layer shown may be a material, such as W, WCr, WTi, NiAl, CrMo, CrV and/or CrTi and has, therefore, a body-centered cubic (bcc) crystal structure. The lattice 150 may be characterized by sites 151 at which atoms or molecules of the seed layer(s) 110 are located and a lattice parameter. For clarity, each site 151 is not labeled. However, a site 151 of the seed layer(s) 110 is represented by a circle in FIGS. 3-5. The lattice parameter for the lattice 150 of the seed layer 110 is al, the distance between sites 151. The natural growth plane of the lattice 150 of the seed layer 110 is the (110) plane. This (110) plane is shown in FIG. 3. The natural growth plane is one which should be in plane if the seed layer is grown on an amorphous substrate. Thus, (110) should be the texture (and the direction perpendicular to the plane of the seed layer 110) if the lattice 150 is grown on an amorphous substrate. For materials such as W, WCr, WTi, NiAl, CrMo, CrV and/or CrTi used in the seed layer(s) 110 and for CoPt, CoCrPt, CoCrTa, CoSm and/or similar materials for the hard bias structure 130, the (110) growth plane is desired for the seed layer(s) 110.

FIG. 4 depicts a view of an exemplary embodiment of a template 152 of portion of a seed layer such as the seed layer 110. The template 152 is for the natural growth plane of the lattice 150. The template 152 corresponds to the (110) plane for the lattice 150 of FIG. 3. The template 152 thus corresponds to a (110) texture, which would be perpendicular to the plane of the page in FIG. 4. The template 152 includes sites 151 and is characterized by template dimensions l1 and d1. Note that one template dimension d1 for the template 152 corresponds to the lattice parameter al. However, the other template dimension l1 is a different distance and corresponds to the distance between sites 151 located on opposite corners of a face of the lattice 150.

The template 152 of the seed layer 150 is desired to be used as a growth template for the hard bias structure 130 having a desired texture and grain size. For hard bias materials such as CoPt, CoCrPt, CoCrTa, and/or CoSm, the structure is hexagonal close-packed (hcp) and a (10*0) texture is desired. Further, smaller grain sizes are desired. The template 152 of the seed layer 110 used is desired to match the template of the desired structure and texture of the hard bias structure 130. Such a template 152 corresponds to the (110) plane of the seed layer(s) 110.

FIG. 5 depicts of portions of templates for exemplary embodiments of a seed layer 110, an adjustment layer 120, and a hard bias structure 130. The template 152 is for the seed layer(s) 110. The template 152 includes sites 151 and is for the (110) plane. For clarity, not all of the sites 151 are labeled, but instead are denoted by circles. The template 152 is also characterized by template dimensions d1 and l1. Thus, both FIGS. 4 and 5 depict the template 152 of the seed layer 110.

The template 156 is for the hard bias structure 130. The template 156 corresponds to the (10*0) plane of an hcp structure. This template 156 may be desired for materials such as CoPt, CoCrPt, CoCrTa, and/or CoSm. Thus, the template 156 includes sites 157 for atoms/molecules of the hard bias structure 130. For clarity, not all of the sites 157 are labeled, but instead are denoted by diamonds. Further, the template dimensions d3 and l3 are shown for the template 156. As can be seen in FIG. 5, there is a mismatch between the template 152 of the seed layer(s) 110 and the template 156 of the hard bias structure 130. In particular, both template dimensions d1 and l1 are larger than the template dimensions d3 and l3.

FIG. 5 also depicts the template 154 for the adjustment layer(s) 120. The template 154 includes sites 155. For clarity, not all of the sites 155 are labeled, but instead are denoted by triangles. The template 154 includes template dimensions d2 and l2 and may be characterized by a texture. As can be seen in FIG. 5, the sites 151, 155, and 157 have corresponding locations in each of the templates 152, 154, and 156, respectively. The template 152 also has an additional site 151 at the center. Consequently, the templates 152, 154, and 156, at least to an extent, match. Stated differently, the sites 151, 155, and 157 match for the templates 152, 154, and 156, respectively. Further, the template 154 of the adjustment layer(s) 120 is between the template 152 of the seed layer(s) 110 and the template 156 of the hard bias structure 130. Thus, the template dimension d2 is between the template dimensions d1 and d3 of the templates 152 and 156, respectively. Similarly, the template dimension l2 is between the template dimensions l1 and l3 of the templates 152 and 156, respectively. As a result, the adjustment layer(s) 120 may be viewed as adjusting the template 152 of the seed layer(s) 110 to be closer to the desired template 156 of the hard bias structure 130.

Thus, the adjustment layer 120 is thus configured such that the template 154 of the adjustment layer 120 is between that of the hard bias structure 130 and the seed layer(s) 110. This may be accomplished in a number of ways. For example, the adjustment layer(s) 120 could be made of a material such as Ru, Co, Cr, Mo, V, CoFe and CrTi having the desired texture when grown on the template 152 of the underlying seed layer(s) 110 and having a template dimension(s) (e.g. template dimensions d2 and/or l2 and corresponding sites 155) between those of the seed layer(s) 110 and the hard bias structure 130. Thus, the material selected and grown for the adjustment layer(s) 120 may have a template 154 that is between the templates 152 and 156. In other embodiments, another material that might not have its template dimensions between those of the seed layer(s) 110 and hard bias structure 130 might be used. However, this material would be configured such that the template 156 of the adjustment layer 120 is between that of the hard bias structure 130 and the seed layer(s) 110. For example, the adjustment layer(s) 120 may be made of the same material(s) as the hard bias structure 130, but be deposited in a lighter gas than the hard bias structure 130. Examples of such gases include the deposition gas includes at least one of Ar, Kr, Ne and ArN$_2$ when at least the bottom portion of the hard bias structure 130 is deposited using Xe. The lighter gas may be incorporated into the lattice of the adjustment layer(s) 120 to a greater extent, expanding the lattice to have template dimension(s) between that of the hard bias structure 130 and the seed layer(s) 110. In such a case, the adjustment layer may be magnetic. Alternatively, a material other than what is used for the hard bias structure 130 and having its template dimensions not larger than those of the hard bias structure 130 might be used. Deposition in a lighter gas may adjust the template dimensions to be between the dimensions d1 and d3 and between the template dimensions l1 and l3. In other embodiments, a combination of selection of materials and adjusting of the lattice/template dimensions d2 and/or l2 of the adjustment layer(s) 120 through deposition or other conditions may be used ensure that the template 154 is between the hard bias structure template 156 and the seed layer(s) template 152. Moreover, another mechanism may be used to provide the adjustment layer(s) 120 having the desired template 154.

Thus, using the adjustment layer(s) 120, the layers on which the hard bias structure 130 is grown may have templates 154 that better match the template 156 of the hard bias structure 130. As a result, the grain size and texture of the hard bias structure 130 may be improved. In particular, the grain size may be small and a better quality (10*0) texture may be achieved. Furthermore, the desired structure and magnetic properties of the hard bias structure 130 may be achieved with a very thin adjustment layer(s) 120. In some embodiments, the thickness of the adjustment layer may be as low as one monolayer. In other embodiments, the thickness of the adjustment layer(s) 120 may be as low as one to three monolayers. In other embodiments, the adjustment layer(s) 120 may have a thickness of at least three and not more than ten Angstroms. In yet other embodiments, the adjustment layer(s) 120 may have a thickness of at ten through fifteen Angstroms. Other embodiments may have other, including larger, thicknesses. In addition to being thin, the adjustment layer(s) 120 may allow a reduction in the thickness of the seed layer(s) 110. For example, in some embodiments, the combined thickness of the seed layer(s) 110 and adjustment layer(s) 120 may be up to forty percent less than the thickness of the conventional seed layer 14, yet result in sufficient or improved magnetic properties of the hard bias structure 130. Consequently, performance of the hard bias structure may be maintained or improved while reducing the shield-to-shield spacing of the transducer 100. Performance of the magnetic transducer 100 may, therefore, be enhanced.

Figure 6:
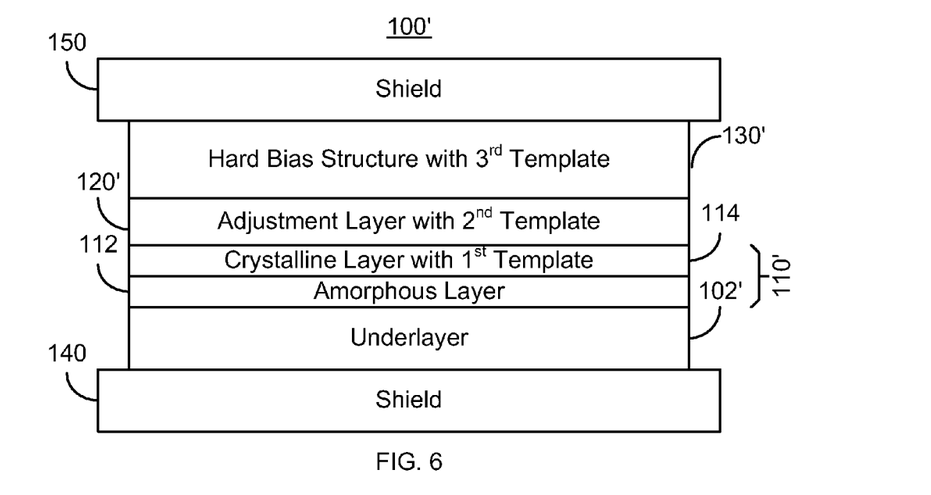
FIG. 6 depicts a portion of a magnetic transducer including an exemplary embodiment of a hard bias structure.

FIG. 6 depicts a portion of a magnetic transducer 100' including an exemplary embodiment of a hard bias structure 130'. Portions of the magnetic transducer 100' are analogous to the magnetic transducer 100 and are, therefore, labeled similarly. The magnetic transducer 100' may be a read transducer that might be part of a merged head that also includes a write transducer (not shown) and resides on a slider (not shown) of a disk drive (not shown). The transducer 100' is also described in the context of particular layers. However, in some embodiments, such layers may include sub-layer(s). Further, although certain layer(s) are described in the context of a single template, a layer may have multiple templates not inconsistent with the description herein. For clarity, FIG. 6 is not drawn to scale.

The magnetic transducer 100' thus includes an underlayer 102', one or more seed layers 110', at least one adjustment layer 120', and a hard bias structure 130'. In addition, shields 140 and 150 are shown. The seed layer(s) 110' includes a first template having a first texture and a first template dimension. The hard bias structure 130' may include materials such as one or more of CoPt, CoCrPt, CoCrTa, and CoSm and is desired to have a high remanence magnetization to and may be used to bias a read sensor. The hard bias structure 130' has a third template corresponding to a third texture and a third template dimension. In one embodiment, the third template corresponds to a (10*0) texture for an hcp lattice. The adjustment layer(s) 120' reside between the seed layer(s) 110' and the hard bias structure 130'. The adjustment layer(s) 120' may include materials such as one or more of Ru, Co, Cr, Mo, V, CoFe and CrTi. The adjustment layer(s) 120' may also include magnetic materials including but not limited to those forming the hard bias structure 130'. The adjustment layer(s) 120' have a second template between the first template of the seed layer(s) 110' and the third template of the hard bias structure 130'.

The seed layer(s) 110' includes an amorphous layer 112 and a crystalline layer 114 on the amorphous layer 112. For example, amorphous layer 112 may include Ta, aluminum oxide, or other amorphous materials. The crystalline layer 112 may include at least one of W, WCr, WTi, NiAl, CrMo, CrV and CrTi W, WCr, WTi, NiAl, CrMo, CrV and CrTi layer. The crystalline layer may have a bcc structure and a (110) natural growth plane. Thus, the layer 114 may have a template that is analogous to the template 152 depicted in FIGS. 4-5. The adjustment layer 120' has a template analogous to the template 154 depicted in FIG. 5. The hard bias structure 130' may have a template analogous to the template 156 depicted in FIG. 5. Furthermore, the adjustment layer(s) 120' may be very thin. In some embodiments, the thickness of the adjustment layer may be as low as one monolayer. In other embodiments, the thickness of the adjustment layer(s) 120' may be as low as one to three monolayers. In other embodiments, the adjustment layer(s) 120' may have a thickness of at least three and not more than ten Angstroms. In yet other embodiments, the adjustment layer(s) 120' may have a thickness of at ten through fifteen Angstroms, or greater.

Thus, the magnetic transducer 100' shares the benefits of the magnetic transducer 100. In particular, a hard bias structure 130' having the desired texture, grain size, and thus magnetic properties may be provided. This may be achieved while maintaining or reducing the thickness of the adjustment layer(s) 120' and the seed layer(s) 110'. More specifically, the thickness of the adjustment layer(s) 120' plus the thickness of the seed layer(s) 110' may be less than or equal to the thickness of the conventional seed layer(s) 14. Consequently, the spacing between the shields 140 and 150 may also be reduced. Performance of the magnetic transducer 100' may thereby be improved.

Figure 7:
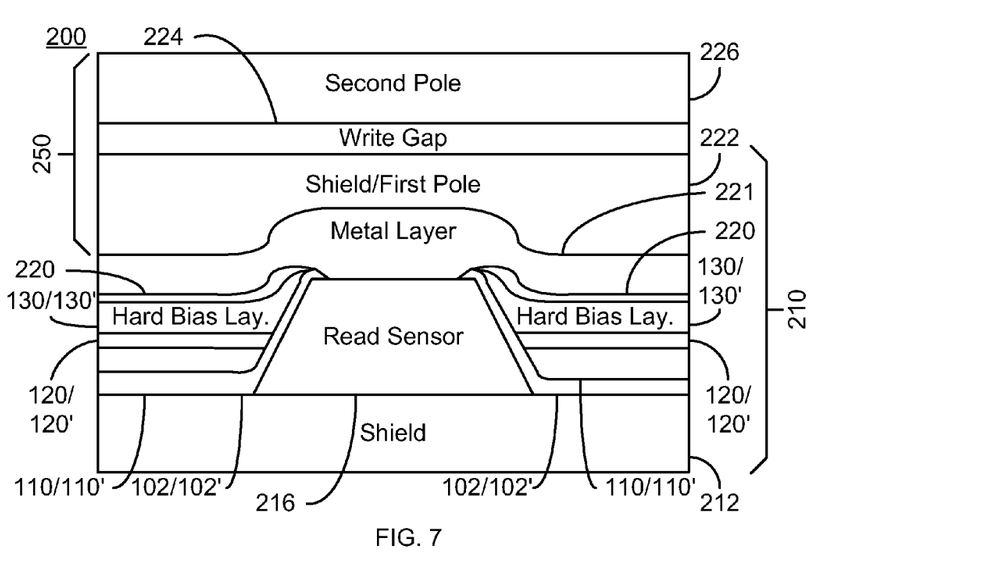
FIG. 7 depicts an exemplary embodiment of a portion of a magnetic head.

FIG. 7 depicts an exemplary embodiment of a portion of a magnetic head 200. The magnetic head 200 includes a read transducer 210 and a write transducer 250. The read transducer 210 corresponds to the transducer 100 and/or 100'. The read transducer 210 includes a shield 212, an insulator or underlayer 102/102', read sensor 216, seed layer(s) 110/110', adjustment layer(s) 120/120', hard bias structure 130/130', hard bias capping layer 220, metal capping layer 221 and shield 222.

In some embodiments, the read sensor 216 is a magnetoresistive or giant magnetoresistive sensor, such as a spin valve or a tunneling magnetoresistive junction. In such a case, the read sensor 216 would typically include at least an antiferromagnetic pinning layer, a magnetic pinned layer adjacent to the antiferromagnetic pinning layer, a nonmagnetic spacer layer, and a free layer. For simplicity, these layers are not separately shown in FIG. 7. The magnetization of the free layer changes direction based upon the magnetic field from a recording medium (not shown). The change in the relative orientations of the magnetization of the free and pinned layers alters the resistance of the read sensor 216. Thus, the read sensor 216 allows the read transducer 210 to read data.

The write transducer 250 includes shield/first pole 222, write gap 224 and second pole 226. In another embodiment, other structures may be part of the write transducer 250. In addition, although shown as a single structure, the shield and first pole of the shield/first pole 222 may be separated.

Because of the use of the adjustment layer(s) 120/120' in combination with the seed layer(s) 110/110' and the hard bias structure 130/130', head 200 shares the benefits of the magnetic transducers 100 and 110'. In particular, a hard bias structure 130/130' having the desired texture, grain size, and thus magnetic properties may be provided. This may be achieved while maintaining or reducing the thickness of the adjustment layer(s) 120/120' and the seed layer(s) 110/110'. Consequently, the spacing between the shields 212 and 222 may also be reduced. Performance of the magnetic transducer 100' may thereby be improved.

Figure 8:
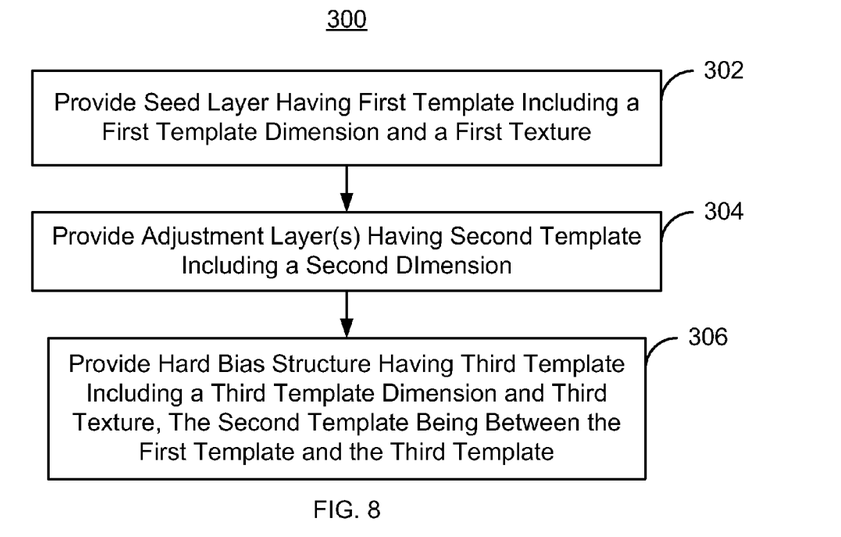
FIG. 8 is a flow chart of an exemplary embodiment of a method for fabricating a hard bias structure.

FIG. 8 is a flow chart of an exemplary embodiment of a method for fabricating a hard bias structure. For simplicity, some steps may be omitted. The method 300 is described in the context of the transducers 100/100'. However, the method 300 may be used for other transducers (not shown). The method 300 also may commence after formation of other structures of the read and/or write transducer. The method 300 is also described in the context of providing a single hard bias structure 130/130'. However, the method 300 may be used to fabricate multiple structures at substantially the same time. The method 300 and structures such as structures 110/110', 120/120', and 130/130', are also described in the context of particular layers. However, in some embodiments, such layers may include sub-layer(s).

A seed layer 110/110' is provided, via step 302. The seed layer has a first template, such as the template 152 including a first template dimension d1 and/or l1 and a first texture. In one embodiment, the first texture is a (110) texture for a bcc lattice. The seed layer 110/110' provided in step 302 may include one or more layers.

At least one adjustment layer 120/120' is provided on the seed layer, via step 304. The adjustment layer(s) 120/120' has a second template including a second template dimension. For example, the adjustment layer 120/120' may have the template 154 including the template dimensions d2 and l2. Step 304 may include depositing a material having a template that is intermediate between that of the seed layer(s) 110/110' and the hard bias structure 130/130'. Such a material may be magnetic or nonmagnetic. Examples of nonmagnetic materials that may be used include Ru, Co, Cr, Mo, V, CoFe and CrTi. In other embodiments, step 304 may include depositing the adjustment layer(s) 120/120' in a gas that is configured to adjust the template dimension(s), for example by expanding the template dimension(s). In one embodiment, the adjustment layer(s) 120/120' may be deposited in Ar, Kr, Ne and/or $ArN_2$, while at least a bottom portion of the hard bias structure 130/130' would be deposited in a heavier gas such as Xe. In some such embodiments, the adjustment layer(s) 120/120' are made of the same material(s) as the hard bias structure(s) 130/130'. Such materials may include CoPt, CoCrPt, CoCrTa and/or CoSm. In other embodiments, a combination of selection of materials and deposition in gas(es) that adjust the template dimension(s) may be used.

A hard bias structure 130/130' is provided on the adjustment layer(s), via step 306. The hard bias structure has a third template including a third template dimension and a third texture. The hard bias structure may, for example, have the template 156 with template dimensions d3 and l3 and a (10*0) texture. Step 306 may include depositing the hard bias structure 130/130' in a gas such as Xe. Materials for the hard bias structure may include CoPt, CoCrPt, CoCrTa and CoSm. The second template of the adjustment layer(s) provided in step 304 is intermediate between the first template and the third template.

Using the method 300, the hard bias structure 130/130' having the desired texture, grain size, and thus magnetic properties may be fabricated. This may be achieved while maintaining or reducing the thickness of the adjustment layer(s) 120/120' and the seed layer(s) 110/110'. Consequently, the spacing between the shields may also be reduced. Performance of the magnetic transducer 100/100' may thereby be improved.

Figure 9:
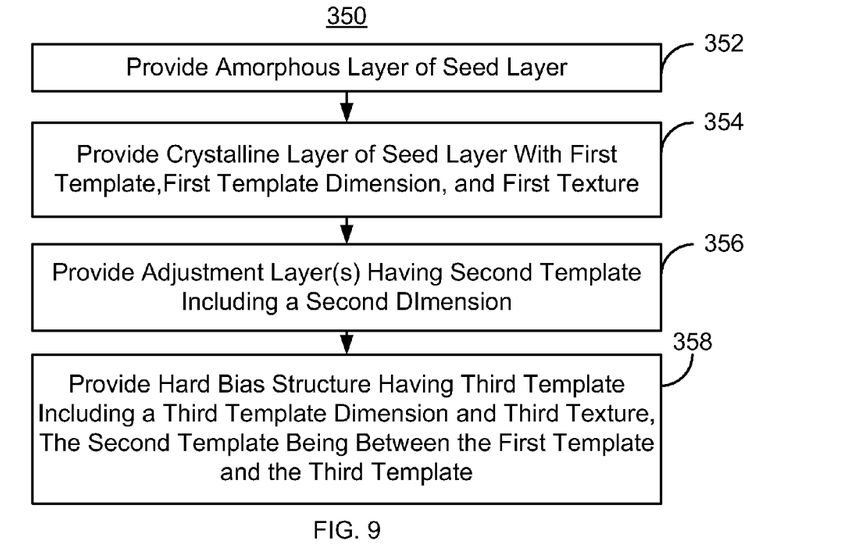
FIG. 9 is a flow chart of another exemplary embodiment of a method for fabricating a hard bias structure.

FIG. 9 is a flow chart of another exemplary embodiment of a method 350 for fabricating a hard bias structure. For simplicity, some steps may be omitted. The method 350 is described in the context of the transducer 100'. However, the method 350 may be used for other transducers (not shown). The method 350 also may commence after formation of other structures of the read and/or write transducer. The method 350 is also described in the context of providing a single hard bias structure 130'. However, the method 350 may be used to fabricate multiple structures at substantially the same time. The method 350 and structures such as structures 110', 120', and 130', are also described in the context of particular layers. However, in some embodiments, such layers may include sub-layer(s).

An amorphous layer, such as the amorphous layer 112 is provided, via step 352. In one embodiment, step 352 includes depositing a Ta layer, an aluminum oxide layer, or another amorphous material on the underlayer 102', which may also be aluminum oxide. A crystalline layer 114 is provided on the amorphous layer 112, via step 354. Because it is deposited on the amorphous layer 112, the crystalline layer has its natural growth texture. In one embodiment, the crystalline layer 114 is a bcc layer having a (110) natural growth texture. Examples of materials used for the crystalline layer 114 may include W, WCr, WTi, NiAl, CrMo, CrV and CrTi. Thus, the seed layer 110' is provided in steps 352 and 354. The crystalline layer 114, and thus the seed layer 110, has a first template, such as the template 152 including a first template dimension d1 and/or l1 and a first texture.

At least one adjustment layer 120' is provided on the seed layer 110', via step 356. The adjustment layer(s) 120' have a second template including a second template dimension. For example, the adjustment layer(s) 120' may have the template 154 including the template dimensions d2 and l2. Step 356 is analogous to step 304 and, therefore, may be performed in a similar manner.

A hard bias structure 130' is provided on the adjustment layer(s), via step 358. The hard bias structure 130' has a third template including a third template dimension and a third texture. The hard bias structure 130' may, for example, have the template 156 with template dimensions d3 and l3 and a (10*0) texture. Step 358 is analogous to step 306 and thus may be performed in a similar manner.

Using the method 350, the hard bias structure 130' having the desired texture, grain size, and thus magnetic properties may be fabricated. This may be achieved while maintaining or reducing the thickness of the combination of the adjustment layer(s) 120' and the seed layer(s) 110'. Consequently, the spacing between the shields may also be reduced. Performance of the magnetic transducer 100' may thereby be improved.

We claim:
1. A magnetic transducer comprising:
   a seed layer, the seed layer having a first template including a first template dimension and a first texture, the first template dimension depending upon the first texture and a first lattice parameter of the seed layer;
   at least one adjustment layer on the seed layer, the at least one adjustment layer having a second template includ- ing a second template dimension and a second texture, the second template dimension depending upon the second texture and a second lattice parameter of the adjustment layer, wherein the at least one adjustment layer consists of a material selected from Ru, Co, Cr, Mo, and V, the at least one adjustment layer having a thickness not more than three monolayers; and
a hard bias structure on the at least one adjustment layer, the hard bias structure having a third template including a third template dimension and a third texture, the second template being between the first template and the third template such that the second template dimension is between the first template dimension and the second template dimension.

2. The magnetic transducer of claim 1 wherein the first texture is (110) and the third texture is (10*0).

3. The magnetic transducer of claim 2 wherein the second template dimension is between the first template dimension and the third template dimension.

4. The magnetic transducer of claim 1 wherein the seed layer further includes an amorphous underlayer.

5. The magnetic transducer of claim 4 wherein the amorphous layer includes at least one of a Ta layer and an aluminum oxide layer.

6. The magnetic transducer of claim 4 wherein the seed layer includes a crystalline layer on the amorphous layer, the crystalline layer including at least one of W, WCr, WTi, NiAl, CrMo, CrV and CrTi.

7. A magnetic transducer comprising:
a seed layer, the seed layer having a first template including a first template dimension and a first texture, the first template dimension depending upon the first texture and a first lattice parameter of the seed layer;
at least one adjustment layer on the seed layer, the at least one adjustment layer having a second template including a second template dimension and a second texture, the second template dimension depending upon the second texture and a second lattice parameter of the adjustment layer, wherein the at least one adjustment layer consists of a material selected from Ru, Co, Cr, Mo, and V; and
a hard bias structure on the at least one adjustment layer, the hard bias structure having a third template including a third template dimension and a third texture, the second template being between the first template and the third template such that the second template dimension is between the first template dimension and the second template dimension;
wherein the at least one adjustment layer is magnetic.

8. A magnetic transducer comprising:
a seed layer, the seed layer having a first template including a first template dimension and a first texture;
at least one adjustment layer on the seed layer, the at least one adjustment layer having a second template including a second template dimension and a second texture; and
a hard bias structure on the at least one adjustment layer, the hard bias structure having a third template including a third template dimension and a third texture, the second template being between the first template and the third template;
wherein the at least one adjustment layer includes a first deposition gas incorporated into the adjustment layer the hard bias structure includes a second deposition gas, the first deposition gas being different from the second deposition gas and being configured to adjust the second template dimension to be between the first template dimension and the third template dimension and provide the second template being between the first and the third templates, wherein the first deposition gas includes at least one of Ar, Kr, Ne and $ArN_2$.

9. The magnetic transducer of claim 8 wherein the hard bias structure corresponds to a hard bias template dimension, and wherein the first deposition gas is configured to expand the second template dimension.

10. The magnetic transducer of claim 8 wherein the first deposition gas is lighter than the second deposition gas.

11. The magnetic transducer of claim 10 wherein the at least one adjustment layer and the hard bias structure include a magnetic material.

12. The magnetic transducer of claim 11 wherein the magnetic material includes at least one of CoPt, CoCrPt, CoCrTa, and CoSm.

13. A magnetic transducer comprising:
a seed layer, the seed layer having a first template including a first template dimension and a first texture;
at least one adjustment layer on the seed layer, the at least one adjustment layer having a second template including a second template dimension and a second texture; and
a hard bias structure on the at least one adjustment layer, the hard bias structure having a third template including a third template dimension and a third texture, the second template being between the first template and the third template;
wherein the at least one adjustment layer includes a deposition gas incorporated into the adjustment layer and configured to adjust the second template dimension to be between the first template dimension and the third template dimension and provide the second template being between the first and the third templates, the deposition gas including at least one of Ar, Kr, Ne and $ArN_2$, wherein the at least one adjustment layer includes at least one of Xe, Ar, Kr, Ne and $ArN_2$ therein.

14. The magnetic transducer of claim 1 wherein the at least one adjustment layer has a thickness at least one monolayer.

15. A disk drive comprising:
a slider;
at least one magnetic transducer residing on the slider, the at least one magnetic transducer including a read sensor, a seed layer, at least one adjustment layer on the seed layer, and a hard bias structure on the at least one adjustment layer, a portion of the hard bias structure being adjacent to the read sensor, the seed layer having a first template including a first template dimension and a first texture, the first template dimension depending upon the first texture and a first lattice parameter of the seed layer, the at least one adjustment layer having a second template including a second template dimension, the second template dimension depending upon the second texture and a second lattice parameter of the adjustment layer, the hard bias structure having a third template including a third template dimension and a third texture, the second template being intermediate between the first template and the third template such that the second template dimension is between the first template dimension and the second template dimension;
wherein the at least one adjustment layer includes a first deposition gas incorporated therein and the hard bias structure includes a second deposition gas incorporated therein, the first deposition gas being different from the second deposition gas and being configured to adjust the second template dimension to be between the first template dimension and the third template dimension and provide the second template being between the first and the third templates, wherein the first deposition gas includes at least one of Ar, Kr, Ne and $ArN_2$.

16. A method for providing magnetic transducer comprising:
    providing a seed layer, the seed layer having a first template including a first template dimension and a first texture, the first template dimension depending upon the first texture and a first lattice parameter of the seed layer;
    providing at least one adjustment layer on the seed layer, the at least one adjustment layer having a second template including a second template dimension, the second template dimension depending upon the second texture and a second lattice parameter of the adjustment layer, wherein the at least one adjustment layer consists of a material selected from Ru, Co, Cr, Mo, and V, the at least one adjustment layer having a thickness not more than three monolayers; and
    providing a hard bias structure on the at least one adjustment layer, the hard bias structure having a third template including a third template dimension and a third texture, the second template being intermediate between the first template and the third template such that the second template dimension is between the first template dimension and the second template dimension.

17. The method of claim 16 wherein the first texture is (110) and the third texture is (10*0).

18. The method of claim 17 wherein the second template dimension is between the first template dimension and the third template dimension.

19. The method of claim 18 wherein the step of providing the seed layer further includes:
    depositing an amorphous underlayer; and
    depositing a crystalline layer on the amorphous layer, the crystalline layer having the first template.

20. A method for providing magnetic transducer comprising:
    providing a seed layer, the seed layer having a first template including a first template dimension and a first texture;
    providing at least one adjustment layer on the seed layer, the at least one adjustment layer having a second template including a second template dimension, wherein the step of providing the at least one adjustment layer further includes depositing the at least one adjustment layer in a first deposition gas, the first deposition gas being incorporated into the adjustment layer and configured to expand the second template dimension of the adjustment layer so that the second template dimension is between first template dimension and the third template dimension; and
    providing a hard bias structure on the at least one adjustment layer using a second deposition gas different from the first deposition gas, the hard bias structure having a third template including a third template dimension and a third texture, the second template being intermediate between the first template and the third template.

21. The method of claim 20 wherein the first deposition gas includes at least one of Ar, Kr, Ne and $ArN_2$.

* * * * *